(12) United States Patent
Allison

(10) Patent No.: US 6,363,468 B1
(45) Date of Patent: Mar. 26, 2002

(54) SYSTEM AND METHOD FOR ALLOCATING MEMORY BY PARTITIONING A MEMORY

(75) Inventor: David Allison, San Ramon, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/337,552

(22) Filed: Jun. 22, 1999

(51) Int. Cl.[7] ............................................... G06F 12/06
(52) U.S. Cl. ...................... 711/173; 711/171; 711/129; 711/112
(58) Field of Search .................. 711/170, 171, 711/173, 129, 203, 172, 205, 206, 207, 221, 111, 112, 113, 114; 707/1, 2, 3, 4, 5, 6, 100, 101, 102; 710/8; 395/500.44

(56) References Cited

U.S. PATENT DOCUMENTS 5,890,014 A * 3/1999 Long .............................. 710/8

* cited by examiner

*Primary Examiner*—Matthew Kim
*Assistant Examiner*—B. R. Peugh
(74) *Attorney, Agent, or Firm*—Finnegan, Henderson, Farabow, Garrett, & Dunner, LLP

(57) ABSTRACT

Systems and methods consistent with the present invention allocate memory of a memory array by partitioning the memory array into subheaps dedicated to frequently used memory blocks. To this end, the system collects memory statistics on memory usage patterns to determine memory block sizes most often used in the memory array. The system uses these statistics to partition the memory array into a main heap and at least one memory subheap. The system then allocates or deallocates memory of the memory array using the memory subheap. Furthermore, the system allocates memory of the memory subheap only for memory blocks having one of the memory block sizes most often used in the memory array.

44 Claims, 6 Drawing Sheets

SYSTEM AND METHOD FOR ALLOCATING MEMORY BY PARTITIONING A MEMORY

RELATED APPLICATION

This application is related to copending U.S. application Ser. No. 09/339,808, entitled "System and Method for Heuristically Allocating Memory," which is assigned to the same assignee and filed on the same date as this application, and incorporated by reference.

BACKGROUND OF THE INVENTION

1. Field of the Invention

The present invention relates to systems and methods for allocating memory and, more particularly, to systems and methods for allocating memory by partitioning the memory.

2. Description of the Related Art

Most data processing systems have a fixed amount of memory for running computer programs. Although a larger amount of memory would increase the speed and flexibility of the system, it would also increase the size and cost of the system as well. This tradeoff is especially true for embedded data processing systems, such as computerized fax machines and telephone answering machines, since they typically have a limited amount of memory to minimize size and cost.

Unfortunately, smaller memories tend to become severely fragmented. Memory becomes fragmented when it contains a random assortment of free memory blocks located between allocated memory blocks. This usually occurs after memory has been repeatedly allocated and deallocated (i.e., freed). FIG. 1 illustrates an example of a fragmented memory array 100 containing blocks of free memory 110 and blocks of allocated memory 120. As shown in FIG. 1, the amount of free memory is broken up into various sizes of free memory blocks 110.

Fragmentation causes several problems. First, fragmentation makes the memory less efficient by breaking up the free memory into blocks of various sizes. Thus, a memory system must search for an adequately sized block of free memory before it can store data of a certain size. This increases processing time, typically by an amount proportional to the number of free blocks. Second, fragmentation often causes a loss of overall effective memory since some of the free blocks will be too small to be of any use.

One way to reduce fragmentation is by having a memory system that allocates memory in an optimum manner based on the particularly memory requirements of the overall data processing system. This approach is nearly impossible, however, since there is no way to predict the exact memory requirements for each program using the memory. Even if the system could determine these memory requirements, the increased amount of processing time to implement this approach would be overly burdensome.

A conventional method for allocating memory is the "first-fit" approach. This approach uses a free list, which is a file created by the memory system that comprises a linked-list of pointers to each block of free memory in the memory array. The pointers are typically ordered by the memory addresses of the corresponding free memory blocks. Thus, the first pointer of the free list points to the first free memory block in the array, while the second pointer points to the second free memory block, and so on. For purposes of illustration, FIG. 1 shows such a free list 130 for memory array 100.

Under the first-fit approach, the memory system traverses the free list until it encounters a pointer to a block large enough to store the data. The memory system usually uses a linear search to traverse the free-list. Accordingly, the longer the free list (i.e., the greater the number of free memory blocks), the longer will be the average time to locate the first block of sufficient size. Although this approach is relatively fast, it is not very efficient. In particular, the first-fit approach simply allocates the data to the first free memory block capable of storing the data, rather than to the free memory block that most closely matches the data size.

Therefore, it is desirable to have a memory system that can allocate memory without causing fragmentation. Furthermore, it is desirable to have a memory system that can reduce fragmentation efficiently and without taking a large amount of processing time.

SUMMARY OF THE INVENTION

Systems and methods consistent with the present invention reduce fragmentation of a memory array by efficiently allocating memory to the memory array, and without requiring a large amount of processing time.

In accordance with the purposes of the invention as embodied and broadly described herein, a memory management system and method consistent with the present invention collects memory statistics to determine memory block sizes frequently used in the memory array. The system uses these statistics to partition the memory array into a memory subheap and a main heap. The system then determines whether to allocate or deallocate a memory block of the memory subheap based on a memory block size associated with the memory subheap.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Overview

Systems and methods consistent with the present invention allocate memory of a memory array by partitioning the memory array into subheaps dedicated to memory blocks frequently used by processing entities executed by a data processing system. To this end, the system collects memory statistics on memory usage patterns of the memory array. These statistics allow the memory system to predict the memory requirements for the next time processing entities are executed by the data processing system.

During the initial boot-up of the data processing system, the memory system reads the previously collected statistics to determine partitions of the memory array. In particular, the memory system partitions the memory array into a main heap and one or more memory subheaps. Each subheap corresponds to a particular memory block size frequently allocated in the memory array. With this structure, the memory system can efficiently allocate or deallocate the frequently used memory block sizes using the corresponding subheap. When the memory system allocates or deallocates a memory block having a size that does not correspond to one of the subheaps, then the memory system uses the main heap. In this way, the memory system efficiently allocates and deallocates memory blocks so as to reduce fragmentation of the memory array.

System Organization

Figure 1:
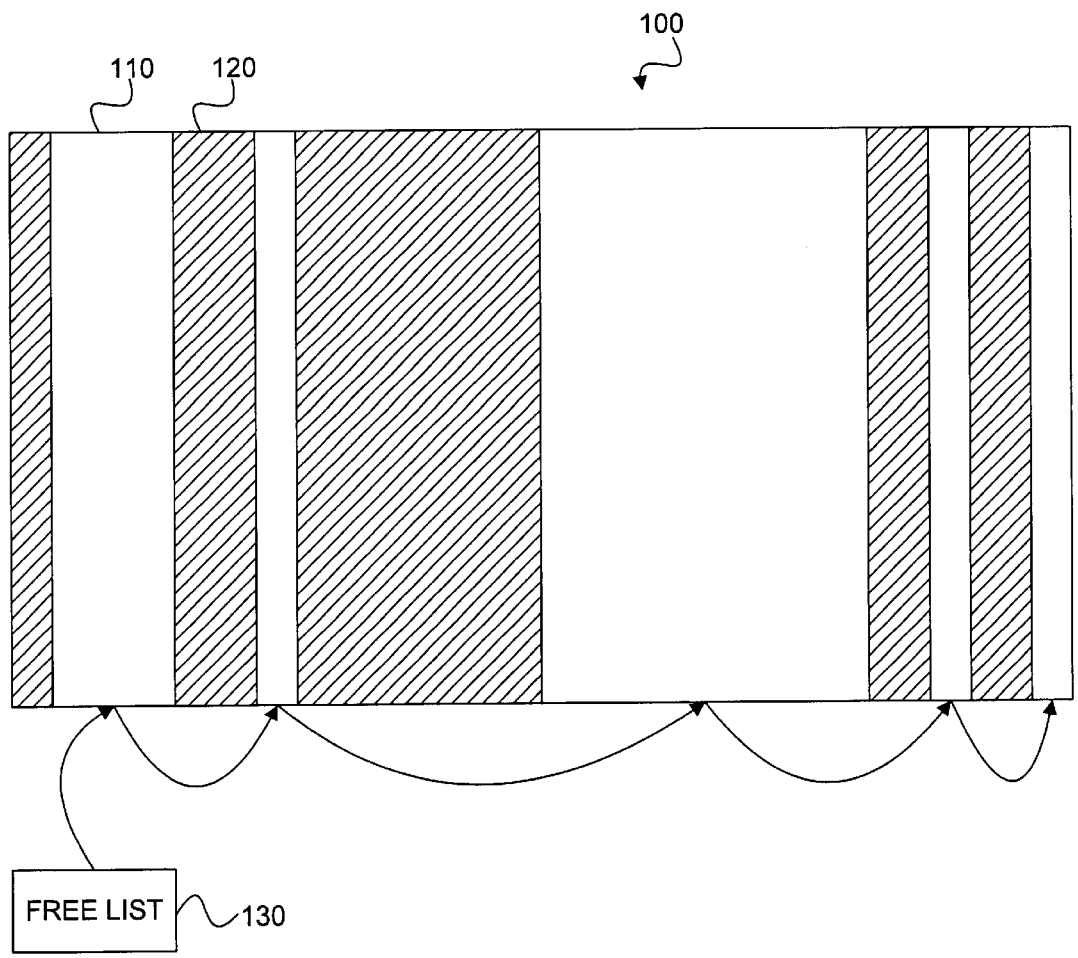
FIG. 1 illustrates an example of a fragmented memory.
Figure 2:
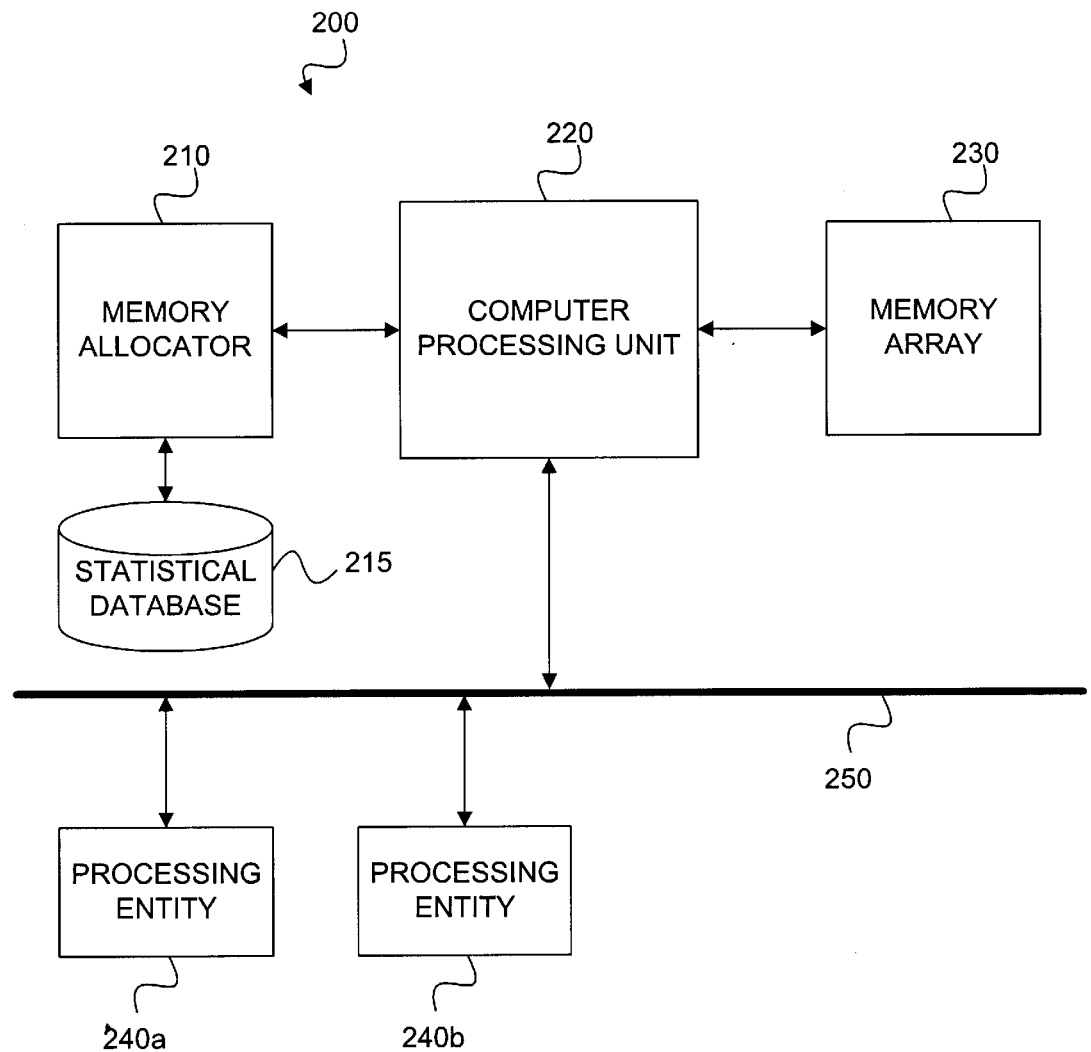
FIG. 2 shows a block diagram of a memory system consistent with the present invention.

FIG. 2 is a block diagram of a memory system 200 consistent with the present invention. As shown in FIG. 2, the memory system 200 includes a memory allocator 210, a statistical database 215, a computer processing unit (CPU) 220, a memory 230, and a number of processing entities 240. Although memory system 200 is preferably part of an embedded data processing system, memory system 200 may be part of any data processing system, such as those found in personal digital assistants, personal computers, network computers, workstations, and even mainframe computers.

Memory allocator 210 is preferably a computer software program, stored on a read only memory (ROM) (not shown), that controls the allocation and deallocation of memory 230. CPU 220 runs the computer program of memory allocator 210 when allocating the memory of memory 230. During operation of the data processing system, memory allocator 210 intermittently stores a number of memory usage statistics in statistical database 215.

These statistics allow memory allocator 210 to predict the memory requirements of the overall data processing system. In particular, many data processing systems, such as embedded systems, behave similarly over different execution cycles. Thus, the size and amount of memory blocks allocated and deallocated in memory 230 during one execution cycle will be similar to those of the next execution cycle. By analyzing the statistics of the system's memory usage patterns, memory allocator 210 can partition memory 230 into sub-heaps corresponding to the blocks of memory most often allocated and deallocated in memory 230. During operation, memory allocator 210 stores these statistics in a statistical database 215, which may be a programmable ROM (PROM) that can save the statistical data for later use.

CPU 220 also runs processing entities 240 via a bus line 250. Processing entities 240 are either hardware devices or computer software programs preferably stored on a random access memory (RAM) (not shown). Processing entities 240 output instructions to CPU 220 requesting CPU 220 to either allocate or deallocate a portion of memory 230. When allocating memory, processing entities 240 typically generate the actual data stored in memory 230. Thus, memory allocator 210 controls CPU 220 when allocating the memory of memory 230 based on an instruction received from one of processing entities 240.

Figure 3:
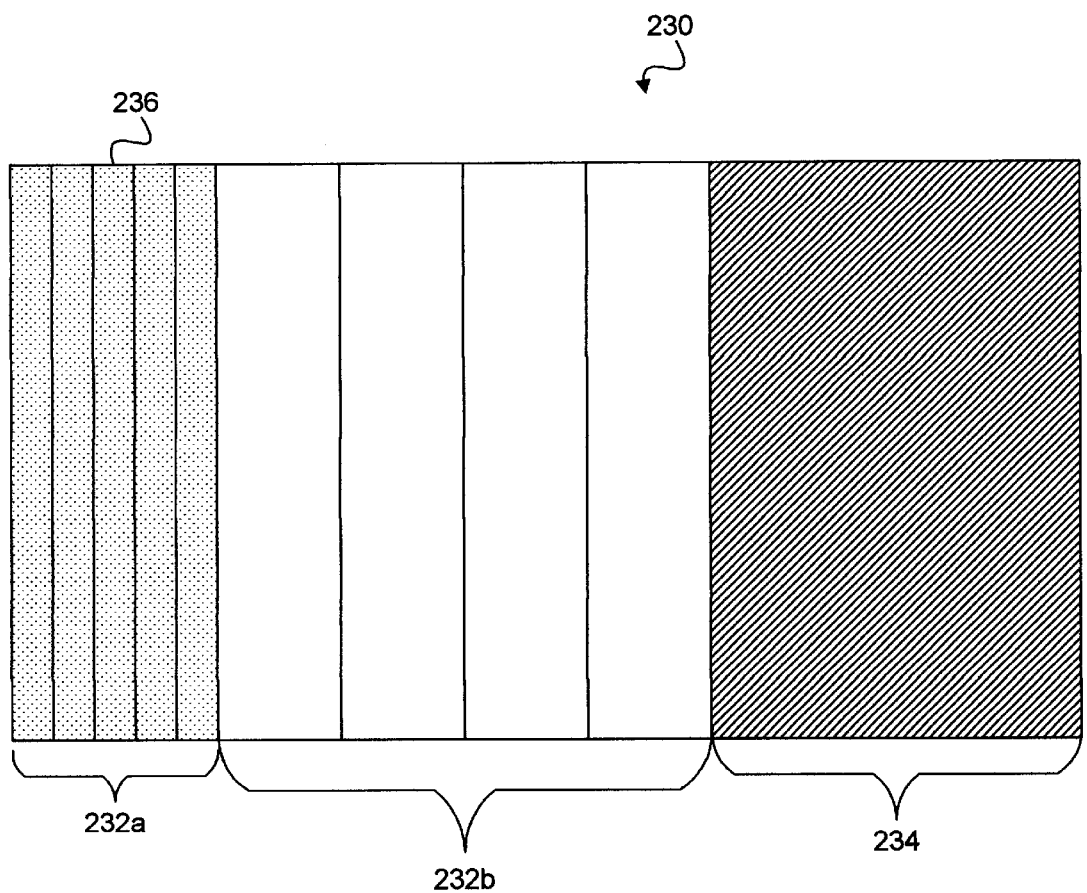
FIG. 3 illustrates a partitioned memory consistent with present invention.

FIG. 3 illustrates a partitioned memory consistent with present invention. As described above, memory allocator 210 partitions memory 230 based on the statistics stored in statistical database 215. As shown in FIG. 3, memory allocator 210 preferably partitions memory 230 into a plurality of subheaps 232a and 232b and a main heap 234. While FIG. 3 shows only two subheaps 232, systems consistent with the present invention may partition memory 230 into any number of subheaps.

As shown in FIG. 3, each subheap 232 includes a number of memory blocks 236 having the same memory size. Furthermore, each subheap 232 corresponds to memory blocks of a size different than those of the other subheaps. For example, subheap 232a may be dedicated to storing blocks of 32 Bytes of data, while subheap 232b stores 100 KByte blocks. Thus, memory allocator 210 determines which one of subheaps 232 will allocate or deallocate a block based on the size of the block of memory to be allocated or deallocated. For blocks that do not correspond to the memory blocks of one of subheaps 232, memory allocator 210 allocates or deallocates blocks of main heap 234. By this structure, memory system 200 can efficiently allocate and deallocate memory blocks so as to reduce fragmentation of memory 230.

System Operation

Figure 4:
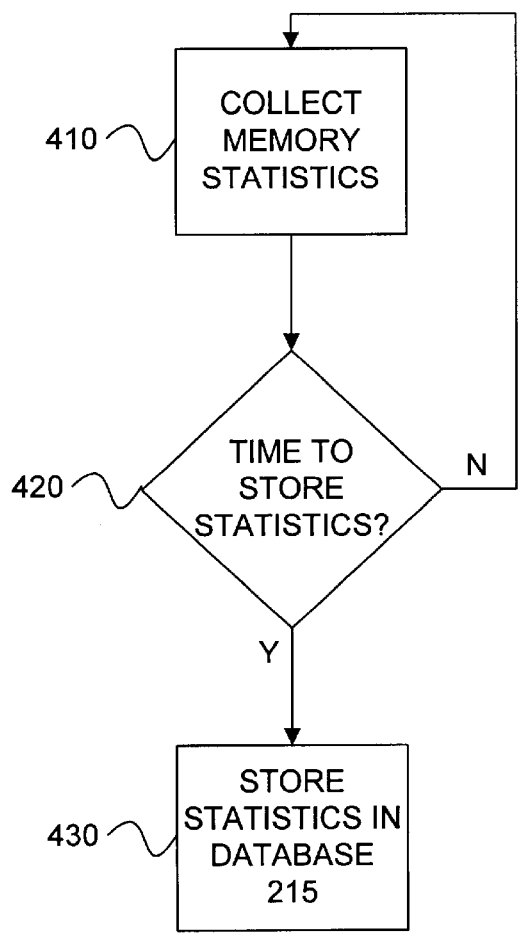
FIG. 4 shows a flow diagram of a method for collecting statistics used to partition a memory consistent with the present invention.

Memory allocator 210 uses the collected statistics to update a stat file, which is used the next time the data processing system is run to determine the number and size of subheaps 232. FIG. 4 shows a flow diagram of a method consistent with the present invention for collecting the statistics used to create the stat file. As shown in FIG. 4, the statistical collecting method begins by memory allocator 210 collecting the statistics (step 410). To this end, memory allocator 210 intercepts the allocation and deallocation instructions sent by processing entities 240 to CPU 220.

Memory allocator 210 then records the memory block size requested by the instruction and whether the instruction requested an allocation or deallocation of memory 230. Memory allocator 210 uses this data to create statistics representative of the memory usage patterns, including: (1) the total number of allocations for each memory block size; (2) the memory size of the block most often allocated by i memory system 200; (3) the total number of deallocations for each memory block size; and (4) the memory size of the block most often deallocated by memory system 200. Memory allocator 210 may collect any number of these statistics to determine the partitioning of memory 230. In addition, memory systems 200 consistent with the invention may collect any type of statistic useful in predicting the memory block sizes most commonly used by the data processing system.

Memory allocator 210 preferably collects the statistics throughout the operation of the associated data processing system. Memory allocator 210 then intermittently stores the accumulated statistics in a stat file stored in statistical database 215 (steps 420 and 430). For example, memory allocator 210 may periodically store the statistics once every several minutes or may do so only during periods of system inactivity to reduce processing load. The storing step may also be performed during the initial boot cycle (at system start-up).

In systems consistent with the invention, memory allocator 210 updates the same stat file during each operation or run of the data processing system. Thus, the more times the data processing system is run, the more accurately the statistics represent the system's memory usage patterns. In this way, memory system 200 creates a highly accurate set of statistics for determining the subheaps 232 of memory 230.

Figure 5:
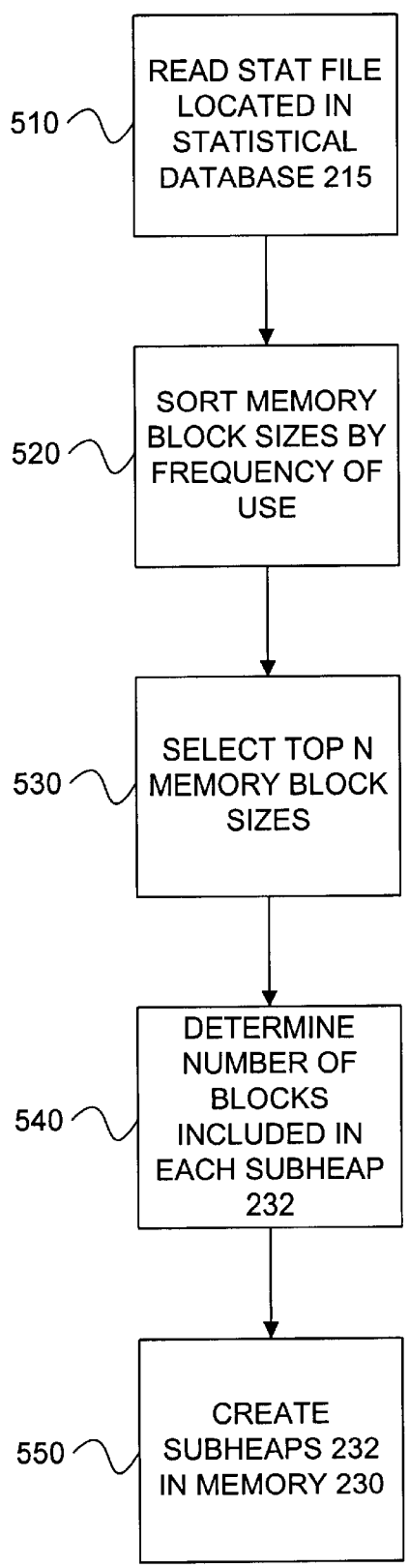
FIG. 5 shows a block diagram of a method for partitioning a memory consistent with the present invention.

FIG. 5 shows a block diagram of a method for partitioning memory 230 consistent with the present invention. Memory allocator 210 preferably performs the partitioning method at start-up using the stat file updated during the previous run, as described above with respect to FIG. 4. As shown in FIG. 5, the method begins by memory allocator 210 reading the stat file stored in statistical database 215 (step 510).

Using the statistics stored in the stat file, memory allocator 210 sorts and ranks the memory block sizes used by memory system 200 according to frequency of use (step 520). For example, memory allocator 210 may rank the memory block sizes allocated to memory 230 according to the number of allocations made for each block size. Alternatively, memory allocator 210 may rank the memory block sizes according to one of the other above statistical measures, or any combination thereof.

Once each of the block sizes have been ranked, memory allocator 210 selects the top N ranked memory blocks (step 530). These blocks, therefore, represent the memory block sizes most often allocated and/or deallocated in memory 230. The number N is preferably selected using a probability analysis, such that there is a predetermined probability that blocks of the size selected will be allocated and/or deallocated in memory 230. However, the number N may also be a predefined number such that memory allocator 210 always selects a predetermined number of the top ranked block sizes.

Next, memory allocator 210 determines the number of blocks to include in each subheap 232 (step 540). This number preferably corresponds to the number of blocks typically allocated by memory system 200, as indicated by the statistics stored in the stat file. Finally, memory allocator 210 then creates subheaps 232 by allocating a portion of memory 230 to each subheap 232 (step 550). The amount of memory dedicated to each subheap 232 corresponds to the block size of each subheap 232 (determined in step 530) multiplied by the number of blocks included in each subheap (determined in step 540). One of ordinary skill in the art will appreciate, however, that subheaps 232 may be of any size, so long as each subheap 232 is equally divisible by its corresponding memory block size.

Figure 6:
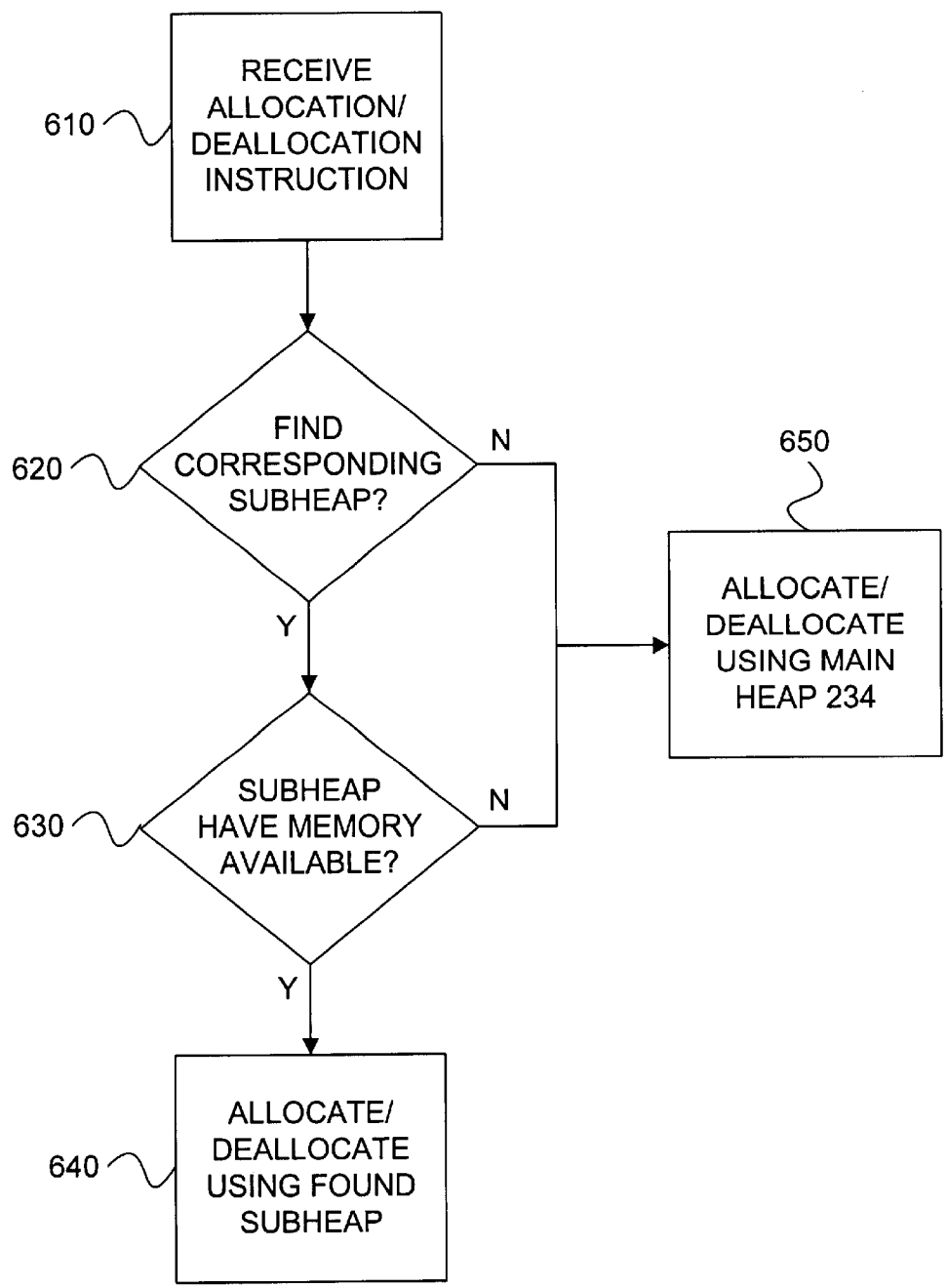
FIG. 6 shows a flow diagram of a method for allocating and deallocating memory consistent with the present invention.

FIG. 6 shows a flow diagram of a method for allocating and deallocating memory consistent with the present invention. As shown in FIG. 6, the method begins when CPU 220 receives an instruction from one of processing entities 240 requesting CPU 220 to allocate or deallocate a portion of memory 230 (step 610).

After CPU 220 receives the allocation instruction, memory allocator 210 performs a search to locate the particular subheap 232 that has blocks corresponding to the memory block size associated with the received instruction (step 620). To speed the search, memory system 200 preferably stores an index of each subheap 232 in a sorted array. In following, memory allocator 210 performs a binary search of the sorted array to quickly determine whether a subheap 232 has blocks corresponding to the block associated with the instruction.

If one of subheaps 232 corresponds to the particular memory block size, and if that subheap still has memory available, then memory allocator 210 allocates or deallocates a memory block associated with that subheap (e.g., subheap 232a) (steps 630 and 640). If none of subheaps 232 corresponds to the particular memory block size, or if the found subheap is currently full, then memory allocator 210 allocates or deallocates a memory block associated with main heap 234 (step 650). In such a case, memory allocator 210 preferably uses a first-fit or other well-known approach to determine which block to allocate to the data.

Memory allocators 210 consistent with the invention may also allocate more of memory 230 to one of subheaps 232 when that subheap becomes full. For example, if the received instruction requests an allocation of a memory size block corresponding to subheap 232a, and subheap 232a is already full, then memory allocator 210 may allocate more of memory 230 to subheap 232a. The amount of memory extended should be sufficient to accommodate future allocations, since repeatedly extending subheaps 232 on a piecemeal basis may overly burden the processing time of the data processing system. The amount of memory extended, however, should not be so large such that it is never used by memory system 200.

Conclusion

Systems and methods consistent with the present invention allocate memory of a memory array by partitioning the memory array into subheaps dedicated to commonly used memory blocks. Such methods consistent with the present invention are applicable to all programs for execution in a multiprocessor system regardless of the computer programming language. For example, C++ is a programming language commonly used to develop programs for execution by multiprocessor computer systems.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the described implementation includes software but the present invention may be implemented as a combination of hardware and software or in hardware alone. Further, the invention may be implemented with both object-oriented and non-object-oriented programming systems.

Although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is defined by the claims and their equivalents.

What is claimed is:

1. A method for managing memory of a memory array, comprising the steps, performed by a processor, of:

collecting memory statistics to determine memory block sizes frequently used in the memory array;

intermittently storing the collected memory statistics in a database for storage;

partitioning the memory array to include a memory subheap and a main heap based on the stored collected memory statistics; and determining whether to allocate or deallocate a memory block of the memory subheap based on a memory block size associated with the memory subheap.

2. The method of claim 1, wherein the collecting step collects at least one of the following statistics: (1) the total number of allocations for each memory block size; (2) the memory block size most frequently allocated; (3) the total number of deallocations for each memory block size; and (4) the memory block size most frequently deallocated.

3. The method of claim 1, wherein the intermittently storing step further includes the substep of:

periodically storing the collected memory statistics at predefined intervals.

4. The method of claim 1, wherein the intermittently storing step further includes the substep of:

storing the collected memory statistics during periods of low processing activity.

5. The method of claim 1, wherein the partitioning step further includes the substep of:

sorting each memory block size used in the memory array according to frequency of use of each memory block size.

6. The method of claim 5, wherein the sorting step sorts the memory block sizes according to at least one of the following statistics: (1) the total number of allocations for each memory block size; (2) the memory block size most frequently allocated; (3) the total number of deallocations for each memory block size; and (4) the memory block size most frequently deallocated.

7. The method of claim 1, wherein the partitioning step further includes the substep of:

selecting a top N of the memory blocks sizes most frequently used by the memory array.

8. The method of claim 7, wherein the selecting step further includes the substep of:

determining the value N according to the probability that memory blocks of a given size will be allocated or deallocated in the memory array.

9. The method of claim 7, wherein the value N is a predetermined number.

10. The method of claim 7, wherein the partitioning step further includes the substep of:

partitioning the memory array into the main heap and N memory subheaps, wherein each memory subheap corresponds to one of the N most frequently used memory blocks sizes.

11. The method of claim 1, wherein the partitioning step further includes the substep of:

determining the number of memory blocks included within the memory subheap.

12. The method of claim 11, wherein the number of memory blocks included within the memory subheap is equal to an average number of allocations made to the memory array for the memory block size allocated in the memory subheap.

13. The method of claim 1, wherein the partitioning step further includes the substep of:

partitioning the memory array into a plurality of memory subheaps.

14. A The method of claim 1, wherein the determining step includes the substep of:

receiving an allocation or deallocation instruction for respectively allocating or deallocating a memory block of a particular memory size;

determining whether the memory subheap stores memory blocks of the particular memory size; and allocating or deallocating memory of the memory array using the memory subheap when the memory subheap allocates memory blocks of the particular memory size and allocating or deallocating memory of the memory array using the main heap when the memory subheap does not allocate memory blocks of the particular memory size.

15. A computer for managing a memory array, comprising:

a memory having program instructions;

a processor, responsive to the programming instructions, configured to:

collect memory statistics to determine memory block sizes frequently used in the memory array;

intermittently store the collected memory statistics in a database for storage;

partition the memory array to include a memory subheap and a main heap based on the stored collected memory statistics; and determine whether to allocate or deallocate a memory block of the memory subheap based on a memory block size associated with the memory subheap.

16. The computer of claim 15, wherein the processor collects at least one of the following statistics: (1) the total number of allocations for each memory block size; (2) the memory block size most frequently allocated; (3) the total number of deallocations for each memory block size; and (4) the memory block size most frequently deallocated.

17. The computer of claim 15, wherein processor is further configured to periodically store the collected memory statistics at predefined intervals.

18. The computer of claim 15, wherein the processor is further configured to store the collected memory statistics during periods of low processing activity.

19. The computer of claim 15, wherein the processor is further configured to sort each memory block size used in the memory array according to frequency of use of each memory block size.

20. The computer of claim 19, wherein the processor is further configured to sort the memory block sizes according to at least one of the following statistics: (1) the total number of allocations for each memory block size; (2) the memory block size most frequently allocated; (3) the total number of deallocations for each memory block size; and (4) the memory block size most frequently deallocated.

21. The computer of claim 15, wherein the processor is further configured to select a top N of the memory blocks sizes most frequently used by the memory array.

22. The computer of claim 21, wherein processor is further configured to determine the value N according to the probability that memory blocks of a given size will be allocated or deallocated in the memory array.

23. The computer of claim 21, wherein the value N is a predetermined number.

24. The computer of claim 21, wherein the processor is further configured to partition the memory array into the main heap and N memory subheaps, wherein each memory subheap corresponds to one of the N most frequently used memory blocks sizes.

25. The computer of claim 15, wherein the processor is further configured to determine the number of memory blocks included within the memory subheap.

26. The computer of claim 25, wherein the number of memory blocks included within the memory subheap is equal to an average number of allocations made to the memory array for the memory block size allocated in the memory subheap.

27. The computer of claim 15, wherein the processor partitions the memory array into a plurality of memory subheaps.

28. The computer of claim 15, wherein the processor is further configured to:

receive an allocation or deallocation instruction for allocating or deallocating a memory block of a particular memory size;

determine whether the memory subheap stores memory blocks of the particular memory size; and allocate or deallocate memory of the memory array using the memory subheap when the memory subheap allocates memory blocks of the particular memory size and to allocate or deallocate memory of the memory array using the main heap when the memory subheap does not allocate memory blocks of the particular memory size.

29. A computer-readable medium containing instructions for controlling a data processing system to perform a method for managing memory, the method comprising the steps of:

collecting memory statistics to determine memory block sizes frequently used in the memory array;

intermittently storing the collected memory statistics in a database for storage;

partitioning the memory array to include a memory subheap and a main heap based on the stored collected memory statistics; and determining whether to allocate or deallocate a memory block of the memory subheap based on a memory block size associated with the memory subheap.

30. The method of claim 29, wherein the collecting step collects at least one of the following statistics: (1) the total number of allocations for each memory block size; (2) the memory block size most frequently allocated; (3) the total number of deallocations for each memory block size; and (4) the memory block size most frequently deallocated.

31. The method of claim 29, wherein the intermittently storing step further includes the substep of:

periodically storing the collected memory statistics at predefined intervals.

32. The method of claim 29, wherein the intermittently storing step further includes the substep of:

storing the collected memory statistics during periods of low processing activity.

33. The method of claim 29, wherein the partitioning step further includes the substep of:

sorting each memory block size used in the memory array according to frequency of use of each memory block size.

34. The method of claim 33, wherein the sorting step sorts the memory block sizes according to at least one of the following statistics: (1) the total number of allocations for each memory block size; (2) the memory block size most frequently allocated; (3) the total number of deallocations for each memory block size; and (4) the memory block size most frequently deallocated.

35. The method of claim 29, wherein the partitioning step further includes the substep of:

selecting a top N of the memory blocks sizes most frequently used by the memory array.

36. The method of claim 35, wherein the selecting step further includes the substep of:

determining the value N according to the probability that memory blocks of a given size will be allocated or deallocated in the memory array.

37. The method of claim 35, wherein the value N is a predetermined number.

38. The method of claim 35, wherein the partitioning step further includes the substep of:

partitioning the memory array into the main heap and N memory subheaps, wherein each memory subheap corresponds to one of the N most frequently used memory blocks sizes.

39. The method of claim 29, wherein the partitioning step further includes the substep of:

determining the number of memory blocks included within the memory subheap.

40. The method of claim 39, wherein the number of memory blocks included within the memory subheap is equal to an average number of allocations made to the memory array for the memory block size allocated in the memory subheap.

41. The method of claim 29, wherein the partitioning step further includes the substep of:

partitioning the memory array into a plurality of memory subheaps.

42. The method of claim 29, wherein the determining step includes the substep of:

receiving an allocation or deallocation instruction for respectively allocating or deallocating a memory block of a particular memory size;

determining whether the memory subheap stores memory blocks of the particular memory size; and allocating or deallocating memory of the memory array using the memory subheap when the memory subheap allocates memory blocks of the particular memory size and allocating or deallocating memory of the memory array using the main heap when the memory subheap does not allocate memory blocks of the particular size.

43. An apparatus for managing a memory array, comprising:

means for collecting memory statistics to determine memory block sizes frequently used in the memory array;

means for intermittently storing the collected memory statistics in a database for storage;

means for partitioning the memory array to include a memory subheap and a main heap based on the stored collected memory statistics; and means for determining whether to allocate or deallocate a memory block of the memory subheap based on a memory block size associated with the memory subheap.

44. A computer data signal embodied in a carrier wave and representing sequences of instructions which, when executed by a processor, cause the processor to securely address a peripheral device at an absolute address by performing the steps of:

collecting memory statistics to determine memory block sizes frequently used in the memory array;

intermittently storing the collected memory statistics in a database for storage;

partitioning the memory array to include a memory subheap and a main heap based on the stored collected memory statistics; and determining whether to allocate or deallocate a memory block of the memory subheap based on a memory block size associated with the memory subheap.

* * * * *

UNITED STATES PATENT AND TRADEMARK OFFICE
CERTIFICATE OF CORRECTION

PATENT NO.      : 6,363,468 B1
DATED           : March 26, 2002
INVENTOR(S)     : David Allison It is certified that error appears in the above-identified patent and that said Letters Patent is hereby corrected as shown below:

Column 7,
Line 38, before "The", "A" should be deleted; and

Column 10,
Line 24, "particular size" should read -- particular memory size --.

Signed and Sealed this

Tenth Day of September, 2002

Attest:

Attesting Officer

JAMES E. ROGAN
Director of the United States Patent and Trademark Office